C. K. BROOKS & E. H. SCHMIDT.
SHOCK ABSORBING MECHANISM.
APPLICATION FILED APR. 26, 1916. RENEWED SEPT. 25, 1918.
1,301,809.
Patented Apr. 29, 1919.
2 SHEETS—SHEET 1.
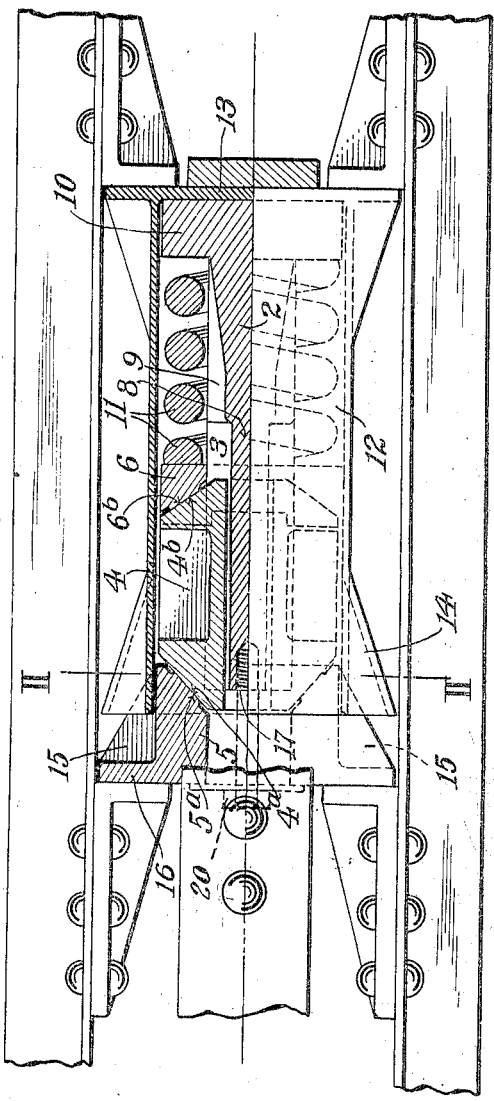
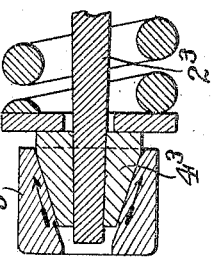
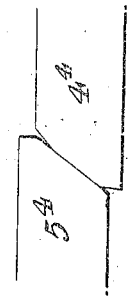
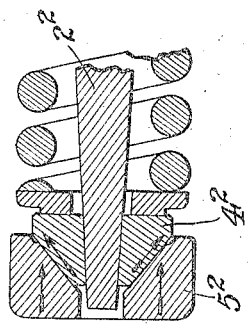
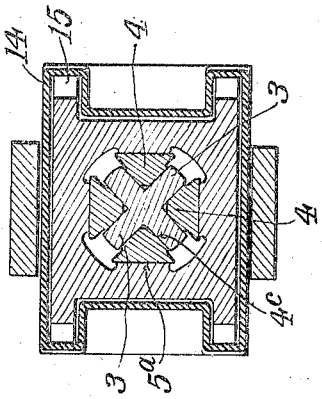
Inventors
Chester K. Brooks
and
Ernest H. Schmidt
By their Attorney

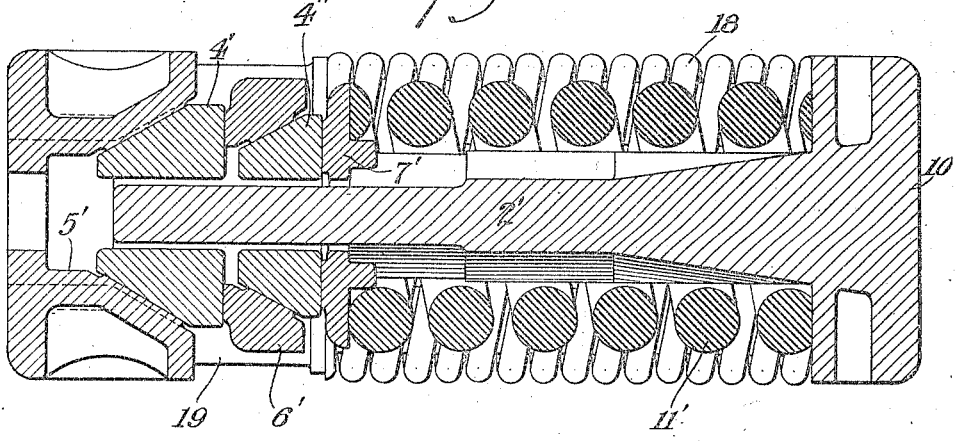
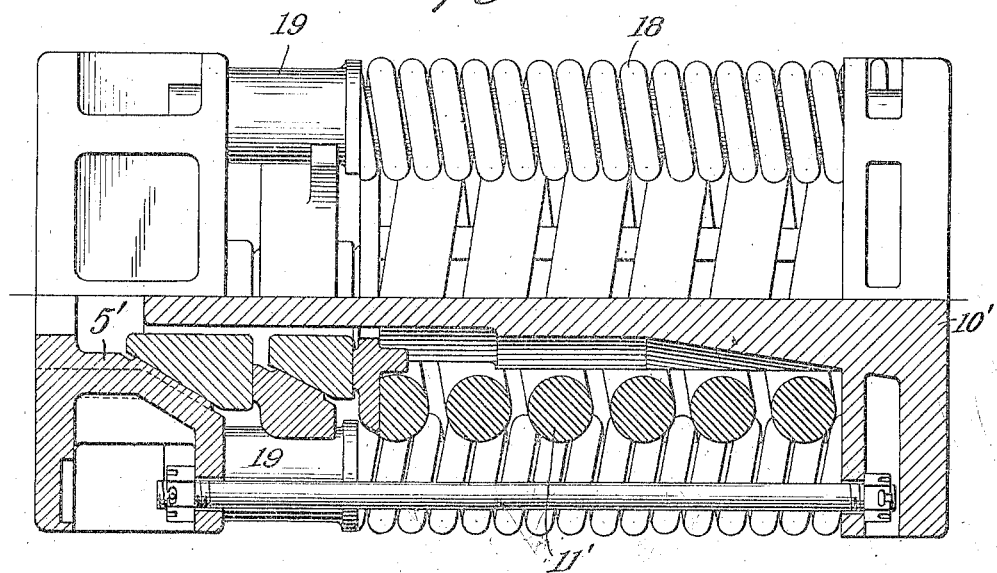

UNITED STATES PATENT OFFICE.

CHESTER K. BROOKS, OF MENTOR, AND ERNEST H. SCHMIDT, OF CLEVELAND, OHIO, ASSIGNORS TO THE NATIONAL MALLEABLE CASTINGS COMPANY, OF CLEVELAND, OHIO, A CORPORATION OF OHIO.

SHOCK-ABSORBING MECHANISM FOR RAILWAY-CARS.

1,301,809.      Specification of Letters Patent.      Patented Apr. 29, 1919.

Application filed April 26, 1916, Serial No. 93,596. Renewed September 25, 1918. Serial No. 255,695.

*To all whom it may concern:*

Be it known that we, CHESTER K. BROOKS and ERNEST H. SCHMIDT, both citizens of the United States, and residents, respectively, of Mentor, Lake County, Ohio, and of Cleveland, Cuyahoga County, Ohio, have jointly invented new and useful Improvements in Shock-Absorbing Mechanism for Railway-Cars, of which the following is a specification, reference being had to the accompanying drawings, in which—

Figure 1 is a plan, partly in section, showing an embodiment of our invention applied to the underframing of a car; Fig. 2 is a section on lines II—II of Fig. 1; Fig. 3 is a section of a modified form of our device; Fig. 4 is a plan, partly in section, of this modification; Fig. 5 is a diagrammatic section of another modified form of wedge, shoes and central member; Fig. 6 is a diagrammatic section of another modified form of wedge, shoes and central member, and Fig. 7 is a further modification of the wedge and shoes.

Our invention relates to shock absorbing or cushioning mechanism, and is particularly adapted for use on railway cars, and consists of an included friction member, friction shoes arranged therearound, and wedging means adapted to press the shoes against the included friction member and drive them longitudinally thereof. Our invention also consists in the construction and coöperation of the parts, which we shall hereinafter describe and claim.

Referring to the embodiment of our invention set forth in Figs. 1 and 2 of the drawings, the included or central friction member 2 has preferably a plurality of longitudinally-extending circumferentially and radially disposed arms 3, which have at their sides friction faces. Between each adjacent pair of arms 3 is mounted a friction shoe 4, the faces 4ᶜ of which engage the friction faces on the arms. In Figs. 1 and 2 we have shown one set of friction shoes, consisting preferably of four shoes. The friction shoes 4 are held in position by a pair of wedges 5 and 6, each of which is in the form of a ring cut away at the center for the passage of the member 2. The wedge 5, which also acts as the front follower, has inclined faces 5ᵃ each of which engages a correspondingly inclined face 4ᵃ on a friction shoe 4. The inner wedge 6, which acts as the spring follower, also has inclined faces 6ᵇ each of which engages a correspondingly inclined face 4ᵇ on a friction shoe. The arms 3 of the central member 2 are tapered somewhat in a longitudinal direction, the arms at the point 8 being somewhat thicker than at their forward ends. To the rear of the frictional surfaces of the arms, the central portion and the arms are preferably reinforced as at 9, to provide additional strength and to distribute more evenly the pressure from the central member through its enlarged rear or base portion 10 to the car. The base 10 is suitably formed on its iner face to provide a bearing for a compression spring 11, which encircles the member 2, and at its forward end bears against the rear face of the wedge 6.

The parts just described may, if desired, be contained in a casing 12, closed at its end 13 and affording a bearing for the base 10, which is held against the end 13 by the compression of the spring 11. The casing 12, at its rear end, is preferably enlarged to provide a bearing against the usual draft sill stops, and at its forward end has pockets or recesses 14 for the admission of the triangularly-shaped bracing ribs 15 on the outer wedge 5. This casing protects the frictional and spring parts of the rigging from shock in excess of their capacity, since the flanges 16 on the wedge follower 5 will strike against the edges of the open end of the casing to prevent the parts from going solid when they have reached the intended limit of travel.

It has been found desirable to place the rigging in the yoke under a moderate initial compression, to eliminate any initial looseness of the parts. To this end we provide the central member 2 with a threaded hole 17 in its outer end, for the reception of a bolt 20, which may be employed to place the spring under the desired compression.

We have found that, in order to make the device of suitable wear-resisting qualities, smooth in operation, and of requisite frictional capacity, it is desirable to make the wedges, shoes and central member of materials of varying degrees of hardness. For instance, the central member 2, as it is a relatively large and expensive part of the rigging, is made with its friction surfaces of a hardness greater than that of the friction shoes 4, so that the greater part of the wear may occur upon the shoes, which, being of simple form and relatively inexpensive to make, are easily replaced when worn out. As the wedge members 5 and 6 are subjected to very great bursting stresses, they are made of a material of great toughness and elasticity, and we therefore prefer to have the wedges of a softer material than either the shoes 4 or central member 2, although good results have been obtained with wedges which are harder than the shoes.

In the operation of the device, the outermost wedge 5, which may be formed as a follower, forces the shoes 4, and with them the inner wedge 6, along the friction member 2, against the action of the spring 11, which bears against the inner wedge 6. As the shoes travel along the friction surfaces on the arms 3 of the central member, the taper of the arms of this member forces them outward radially or transversely of the line of longitudinal movement to an extent dependent on the amount of taper upon the arms of the central member. The movement of the shoes in this radial direction is resisted by the grip of the wedging surfaces on the wedges, which results in a very intense pressure being exerted upon the shoes, urging them into frictional contact with the central member to a much greater extent than the mere wedging action alone. This outward transverse movement of the shoes causes their inclined faces to slide very slightly relatively to the wedging faces of the wedges, and when the faces of the shoes are harder than the faces of the wedges, there will be a tendency of the shoe surfaces to cut into the faces of the wedges and to form shoulders or roughened portions on the faces of the wedges. When any roughening of the wedging faces of the wedges occurs, the freedom of wedging action between the wedges and shoes becomes impaired, the resistance developed by the frictional parts becomes erratic and uneven, and the capacity of the rigging is often seriously affected thereby. To prevent the development of such roughness or cutting between the wedging surfaces we have made the faces of the softer members—in this case the wedges—of lesser extent than the faces of the harder material—in this case the shoes—so that the shoe surfaces overlap or extend beyond the surfaces on the wedges which they engage. It will be seen that, as the shoes overlap the wedges, particularly at the edges toward the spring, such cutting or roughening will not occur. Referring to Fig. 2, which shows the shoes 4 engaging the arms 3 of the central member 2, we also prefer to make the engaging faces 4° of such shoes of lesser extent laterally than the harder faces of the arms 3, so that the arm faces will not cut into and form shoulders on the surfaces of the relatively softer shoes. In this case the formation of shoulders would not interfere with the wedging action as these are friction surfaces and not wedging surfaces, but we have found that the formation of shoulders on these friction faces is very detrimental to the capacity of the device in case a shoe becomes slightly shifted or displaced from its normal path of movement, and thereby loses its full frictional contact, by reason of the formation of such shoulders.

As the front wedge 5 forces the shoes and rear wedge 6 along the central member, the outward or transverse movement of the shoes (where the wedges are of relatively greater elasticity) also results in the elastic expansion of the wedges to a certain extent, which will serve to maintain an elastic wedging grip on the friction shoes, to reduce to some extent the slippage between the wedging faces of the shoes and wedges.

In Figs. 3 and 4 is shown a modified form of our device, in which 2' indicates the central friction member, preferably formed at its rear end into an enlarged plate or base 10', which is designed to abut against the usual draft sill stops (not shown) attached to the car structure. The central member has two sets of friction shoes 4' and 4" bearing in the reëntrant angles formed by its arms, and there is a wedge ring 5' having inclined surfaces engaging the shoes 4' of one set, and a wedge 6' at its forward side engaging the shoes 4', and at its rear side having a wedging engagement with the shoes 4" of the second set, said wedges and sets of shoes being arranged alternately and in tandem. The foremost wedge 5' preferably comprises the front follower, also intended to bear against draft sill stops. To the rear of the rearmost set of shoes is an intermediate follower 7', which bears against said shoes at its forward side, and at its rear side against one end of a compression spring 11'. Said spring surrounds the central member 2' as do the wedges 5' and 6' and the follower 7', and said spring bears at its rear end against the forward face of the base 10'. In this form of our device, as the angles of wedging engagement between shoes and wedges are relatively sharper than those of the form of Fig. 1 and the taper of the arms of the central member 2' more gradual, we prefer to provide the release springs 18, which bear at one end against the base 10', and at their other ends against releasing plungers 19, which in turn abut against the forward wedge 5' and after release of this wedge, against the second wedge 6'. These release springs 18 assist the compression spring 11' in returning the parts to normal position, by releasing the wedging engagement between the wedges and sets of shoes.

In Fig. 5 we have shown a diagrammatic representation of central member, shoes and wedge, in which a comparatively large amount of outward or lateral movement of the shoes occurs, due to the large amount of taper upon the central member $2^2$. The wedging angle between shoes $4^2$ and wedge $5^2$ is blunt (being somewhat similar to the angles shown in Fig. 1), which diminishes to some extent the outward expanding pressure exerted by the shoes upon the wedge. This pressure, however, is still sufficient to cause the wedge $5^2$ to expand slightly, but, due to the excessive taper upon the member $2^2$, the shoes will move outwardly to a much greater extent than the wedge will expand. The shoes will therefore move outward relatively to the wedge, as indicated by the arrows. When the shoes are of harder material than the wedge, as is the case here illustrated, it is necessary to allow them to overlap the wedge in a direction toward the spring, which is the direction toward which relative movement of the shoes occurs when under pressure.

In the diagrammatic representation of Fig. 6 we have shown a condition opposite to that of Fig. 5, and somewhat similar to that shown in Figs. 3 and 4. The acute wedging angle between shoes $4^3$ and wedge $5^3$ throws a very great expansion stress upon the wedge, and this, in combination with the very slight taper upon the central member $2^3$, by reason of which the transverse movement of the shoes is relatively small, results in a relative movement of the wedge over the shoes in a direction indicated by the arrows. Under these circumstances, the relative movement of the shoes to the wedge takes place in a direction away from the spring and when the shoes are of a harder material than the wedge, as is the case here illustrated, it is necessary to allow them to overlap the wedge in that direction.

Both conditions illustrated in Figs. 5 and 6 have been met in the operation of our improved device, and for this reason we have found it desirable to allow the harder member to overlap the softer, both toward and away from the spring, to take care of possible relative movement in either direction.

In Fig. 7 we have shown a further modification of wedge $5^4$ and shoes $4^4$, in which the harder member is the wedge and the softer member is the shoe. In this case the softer member, the shoe, is cut away so as to permit the wedge to overlap each shoe.

It will be understood that the above described relative movement between the wedging surfaces on the shoes and wedges is extremely small in extent—so small as to be scarcely perceptible to the eye, and not at all comparable to the relative movement between the friction surfaces on the shoes and the central friction member. Such movement between the wedging surfaces is small not only because of the relatively slight amount of taper on the arms of the central member but also because the outward movement of the shoes is to a considerable extent offset by the outward expansion of the wedge rings.

The terms and expressions which we have employed are used as terms of description and not of limitation, and we have no intention, in the use of such terms and expressions, of excluding any mechanical equivalent for the features shown and described, but recognize that various modifications are possible within the scope of the invention claimed.

What we claim is:

1. In frictional shock absorbing mechanism, a longitudinally-extending included friction member having a plurality of radially-disposed arms, each arm having longitudinally-tapered friction faces, a plurality of friction shoes arranged between said arms and in frictional engagement with the side faces thereof, each shoe having an inclined wedging face, and an integral wedge member encircling said included member and engaging the wedging faces of said shoes to compress the shoes against the included member, and a compression spring, the said shoes being adapted to be moved longitudinally of the included friction member by a wedge, and to be moved transversely of the included member by the taper on the arms thereof.

2. In frictional shock absorbing mechanism, a longitudinally-extending included friction member having a plurality of radially-disposed arms, shoes arranged between said arms and in frictional engagement with the side faces thereof, an integral wedge member encircling said included member and engaging the wedging faces of said shoes to compress the shoes against the included member, and a compression spring, the arms of the included member increasing progressively in width toward the spring.

3. In frictional shock absorbing mechanism, a central friction member having longitudinally-extending tapered friction faces, friction shoes engaging said faces, a wedge encircling said shoes and engaging outer faces thereon and a compression spring, the wedge being a continuous unitary structure capable of expansion under pressure from the shoes, when the shoes are moved laterally, and by its resistance to expansion providing an elastic grip upon the shoes to minimize slippage of the wedging faces of the wedge relative to the wedging faces of the shoes.

4. In frictional shock absorbing mechanism, a compression spring, a longitudinally-extending included friction member having a plurality of radially disposed arms, and a plurality of friction shoes arranged between said arms and in frictional engagement with the side faces thereof, each shoe having a wedging face, and an integral wedge member encircling said included member and engaging the wedging faces of said shoes to compress the shoes against the included member, the engaging faces of wedge and shoes being of differing hardness and the harder member having its engaging face overlapping and extending beyond the engaging face of the softer member in the direction in which it moves away from such member, to prevent the harder member from cutting into the face of the softer member.

5. In frictional shock absorbing mechanism, a compression spring, a longitudinally-extending included friction member having a plurality of radially-disposed arms, and a plurality of friction shoes arranged between said arms and in frictional engagement with the said faces thereof, each shoe having a wedging face, and an integral wedge member encircling said included member and engaging the wedging faces of said shoes to compress the shoes against the included member, the engaging faces of the shoes being of greater extent and of greater hardness than the engaging faces of the wedge, to prevent the shoes from cutting into the faces of the wedge.

CHESTER K. BROOKS.
ERNEST H. SCHMIDT.